United States Patent [19]

Langer et al.

[11] Patent Number: 4,920,191

[45] Date of Patent: Apr. 24, 1990

[54] LIQUID CRYSTALLINE POLYESTER SILOXANES

[75] Inventors: Matthew E. Langer, Guilderland; Peter P. Policastro, Niskayuna; Allan R. Shultz, Scotia, all of N.Y.

[73] Assignee: General Electric Company, Schenectady, N.Y.

[21] Appl. No.: 319,028

[22] Filed: Mar. 6, 1989

[51] Int. Cl.$^5$ ............................................. G08G 77/04
[52] U.S. Cl. ..................................................... 528/26
[58] Field of Search ......................................... 528/26

[56] References Cited

U.S. PATENT DOCUMENTS

| | | | |
|---|---|---|---|
| 3,067,169 | 12/1962 | Krimm et al. | 528/26 |
| 3,701,815 | 10/1972 | Matzner | 528/26 |
| 4,613,641 | 9/1986 | Haubennestel et al. | 528/26 |
| 4,766,181 | 8/1988 | Ostrozynski et al. | 528/26 |

*Primary Examiner*—John Kight, III
*Assistant Examiner*—Kriellion Morgan
*Attorney, Agent, or Firm*—William A. Teoli; James C. Davis, Jr.; William H. Pittman

[57] ABSTRACT

Liquid crystalline polyester-siloxanes are provided resulting from the condensation of hydroxybenzoic acid with a mixture of 4,4'-(1,1,3,3-tetramethyl-1,3-disiloxanediyl)bisbenzoic acid and a dihydric phenol such as biphenol or hydroquinone. Terephthalic acid also can be used.

5 Claims, No Drawings

LIQUID CRYSTALLINE POLYESTER SILOXANES

CROSS REFERENCE TO ERLATED APPLICATIONS

Reference is maded to copending applications Ser. Nos. 07/319,026, 07/319,025 and 07/319,027, filed concurrently herewith and assigned to the same assignee as the present invention.

BACKGROUND OF THE INVENTION

The present invention relates to certain liquid crystalline polyester siloxanes resulting from the condensation of tetraorganodisiloxane bisbenzoic acid and parahydroxybenzoic acid with particular dihydric phenols such as biphenol or hydroquinone and, in particular instances, in further combination with terephthalic acid.

Prior to the present invention, certain polyestersiloxanes were prepared from 4,4'-(1,1,3,3-tetramethyl-1,3-disiloxanediyl)bis(benzoic acid) as shown by D. W. Lewis and G. C. Gainer, *Journal of American Chemical Society*, 74, 2931 (1952). In copending application Ser. No. [RD-18734], 4,4'-(1,1,3,3-tetramethyl-1,3-disiloxanediyl)bis(benzoic acid) included within the formula

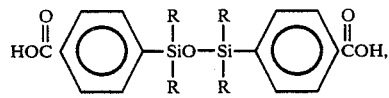

(1)

where R is the same or different $C_{(1-13)}$ monovalent hydrocarbon radical, or $C_{(1-13)}$ monovalent hydrocarbon radical substituted with radicals inert during condensation can be condensed with various dihydric phenols along with other aromatic organodicarboxylic acids to produce a variety of polyester-siloxanes.

It has now been discovered that if the tetraorganodisiloxane bisbenzoic acid of formula (1) is condensed with parahydroxybenzoic acid, and particular dihydric phenols such as diphenol, hydroquinone or 4,4'-dihydroxydiphenyl ether, the resulting polyester siloxanes exhibit liquid crystalline properties. As a result, the liquid crystalline polyester siloxanes of the present invention exhibit lower processing temperatures and improved strength after being injection molded into particular shapes in various applications.

STATEMENT OF THE INVENTION

There is provided by the present invention liquid crystalline polyester-siloxanes selected from the class consisting of (1) a composition comprising
(A) 20 to 90 mole percent of hydroxybenzoic acid nits,
(B) 5 to 50 mole percent of tetraorganodisiloxanebisbenzoic acid units of the formula

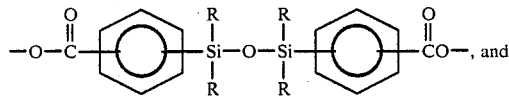

(C) 0 to 50 mole percent of terephthalic acid units, condensed with
(D) 5 to 50 mole percent of biphenol units, and
(2), a composition comprising (A) and (B) condensed with a member selected from the class consisting of
(E) 5 to 50 mole percent of hydroquinone units, and
(F) 5 to 50 mole percent of diphenyletherbishydroxy units,
where the mole percents of the individual condensed units of the respective liquid crystalline polyester-siloxanes ABCD, ABD, ABE, and ABF are based on the total moles of the condensed units in the respective liquid crystalline polyestersiloxanes of (1) and (2), and R is as previously defined.

Radicals included within R of formula (1) are, for example, $C_{(1-8)}$ alkyl radicals, such as methyl, ethyl, propyl, butyl, pentyl and hexyl; haloalkyl radicals, such as chloroethyl; alkenyl radicals, such as vinyl and propenyl; cycloaliphatic radicals, such as cyclopropyl, cyclobutyl and cyclohexyl; cyanoalkyl radicals, such as cyanoethyl and cyanopropyl; trifluoropropyl; $C_{(6-13)}$ aryl radicals, such as phenyl, tolyl, xylyl and naphthyl; and alkaryl radicals, such as methylphenyl and ethylpropyl.

The tetraorganodisiloxane bisbenzoic acid which is used in the practice of the present invention can be made in accordance with the procedures of D. W. Lewis and G. C. Gainer, *Journal of American Chemical Society*, 74, 2931 (1952).

The liquid crystalline polyester siloxanes of the present invention can be made by melt polymerizing the tetraorganodisiloxane bisbenzoic acid, hydroxybenzoic acid and dihydric phenol, such as biphenol, hydroquinone and 4,4'-dihydroxydiphenyl ether. Polymerization can be effected in the melt, while the aforementioned dihydric phenols are in the form of their respective diacetates, while the parahydroxybenzoic acid can be in the form of 4-acetoxybenzoic acid. Temperatures in the range of from 200° C. to 450° C. can be used.

The liquid crystalline polyester-siloxanes of the present invention can be used as molding compounds, composite matrix materials and films. The polyester-siloxanes offer advantages, such as lower processing temperatures, improved melt flow and lower moisture and absorption. In particular instances, liquid crystalline polyester-siloxanes with extended siloxane blocks also can be used as thermoplastic elastomers.

In order that those skilled in the art will be better able to practice the present invention, the following example is given by way of illustration and not by way of limitation. All parts are by weight.

A mixture of 1.0 millimole of biphenol diacetate, 1.0 millimole of 4,4'-(1,1,3,3-tetramethyl-1,3-disiloxanediyl)bis(benzoic acid), referred to hereinafter as disiloxanediyl bisbenzoic acid and 8.0 millimole of 4-acetoxybenzoic acid were heated at 280.C (760 torr) for 0.5 hour under nitrogen with continuous stirring, 280.C (20 torr) for 0.5 hour and 320.C (20 torr) for 1 hour while acetic acid distilled off. The mixture was then allowed to cool to room temperature. There was obtained a product which was a polyester siloxane composed of chemically combined biphenol units, parahydroxybenzoic acid units, and disiloxane bisbenzoic acid units.

Additional liquid crystalline polyesters were prepared following the same procedure utilizing hydroquinone diacetate (HQ), 4,4'-dihydroxydiphenyl ether diacetate (DHPE) and terephthalic acid (TA).

The various liquid crystalline polyester-siloxanes were examined for birefringence using a Leitz Laborlux 12 cross-polarizing microscope, a Mettler FP82 Hot Stage, and a Mettler FP80 Controller. A Highly ordered facile crystalline behavior was detected by a Perkin Elmer Model DSC-2C Differential Scanning Calorimeter.

The following results were obtained:

TABLE 1

| Liquid Crystalline Polyester Siloxanes | | | |
|---|---|---|---|
| Composition | Melt Birefringent | Tg (°C.) | Tm (°C.) |
| BP/1 (1:1) | No | 101 | — |
| HQ/1 (1:1) | No | 68 | — |
| DHPE/1 (1:1) | No | 98 | — |
| BP/1/POB (1:1:3) | Yes | 132 | 428 |
| BP/1/POB (1:1:8) | Yes | 122 | 384 |
| HQ/1/POB (1:1:3) | Yes | 105 | 407 |
| DHPE/1/POB (1:1:3) | Yes | 115 | 399 |
| BP/1/POB/TA (2:1:6:1) | Yes | 106 | 263 |

Key:
BP = biphenol diacetate
HQ = hydroquinone diacetate
DHPE = 4,4'-dihydroxydiphenyl ether diacetate
TA = terephthalic acid
POB = 4-acetoxybenzoic acid
1 = 4,4'-(1,1,3,3-tetramethyl-1,3-disiloxanediyl)bis(benzoic acid)

The above results show that liquid crystalline polyester siloxanes can be obtained in accordance with the practice of the present invention. The liquid crystalline polyester siloxanes also include siloxane bisbenzoic acid units where the siloxane block has up to 100 chemically combined diorganosiloxy units.

Although the above example is directed to only a few of the very many variables which can be utilized in the practice of the present invention to prepare the liquid crystalline polyester siloxanes, it should be understood that the present invention is directed to a much broader variety of liquid crystalline polyester siloxanes as shown in the description preceding this example.

What is claimed is:

1. Liquid crystalline polyester-siloxanes selected from the class consisting of
   (1) a composition comprising
   (A) 20 to 90 mole percent of hydroxybenzoic acid units,
   (B) 5 to 50 mole percent of tetraorganodisiloxanebisbenzoic acid units of the formula

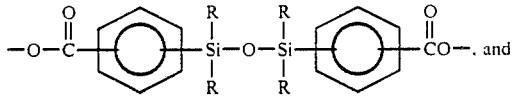

(C) 0 to 50 mole percent of terephthalic acid units, condensed with
   (D) 5 to 50 mole percent of biphenol units and
   (2) a composition comprising (A) and (B) condensed with a member selected from the class consisting of
   (E) 5 to 50 mole percent of hydroquinone units, and
   (F) 5 to 50 mole percent of diphenyletherbishydroxy units, where the mole percents of the individual condensed units of the respective liquid crystalline polyester-siloxanes ABCD, ABD, ABE and ABF are based on the total moles of the condensed units in the respective liquid crystalline polyestersiloxanes of (1) and (2) and R is a member selected from the class consisting of the same or different $C_{(1-13)}$ monovalent hydrocarbon radicals and $C_{(1-13)}$ monovalent hydrocarbon radicals substituted with radicals inert during condensation.

2. A liquid crystalline polyester siloxane in accordance with claim 1, consisting essentially of chemically combined biphenol units, 1,3-disiloxanediyl bisbenzoic acid units and parahydroxybenzoic acid units.

3. A liquid crystalline composition in accordance with claim 1 consisting essentially of condensed hydroquinone units, 1,3-disiloxane bisbenzoic acid units and parahydroxybenzoic acid units.

4. A liquid crystalline polyester siloxane in accordance with claim 1 consisting essentially of dihydroxydiphenyl ether units, 1,3-disiloxane bisbenzoic acid units and parahydroxybenzoic acid units.

5. A liquid crystalline polyester siloxane in accordance with claim 1 consisting essentially of biphenol units, 1,3-disiloxane bisbenzoic acid units, parahydroxybenzoic acid units and terephthalic acid units.

* * * * *